(12) United States Patent
Soares et al.

(10) Patent No.: US 6,301,094 B1
(45) Date of Patent: Oct. 9, 2001

(54) DRAWOUT UNIT AND LOAD/LINE TERMINAL ASSEMBLY

(75) Inventors: Gilbert A. Soares; Richard E. Bernier; John J. Struble, Jr., all of Mebane; Charles W. Piper, Burlington, all of NC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/539,951

(22) Filed: Mar. 31, 2000

Related U.S. Application Data

(63) Continuation of application No. 09/438,108, filed on Nov. 10, 1999, now abandoned.

(51) Int. Cl.$^7$ .................................................. H02B 11/12
(52) U.S. Cl. .................... 361/608; 361/611; 361/624; 361/639
(58) Field of Search .................... 361/600, 601, 361/606, 608, 611, 614, 624, 634, 637–640, 642, 644, 648–650, 652, 668–669, 673, 822–823

(56) References Cited

U.S. PATENT DOCUMENTS

| | | | |
|---|---|---|---|
| 4,700,271 | 10/1987 | Lio et al. | 361/335 |
| 5,046,173 | 9/1991 | Wall, Jr. | 361/353 |
| 5,343,356 | 8/1994 | Hancock | 361/637 |
| 5,898,566 | 4/1999 | Noschese et al. | 361/642 |
| 5,966,295 | 10/1999 | Park | 361/823 |
| 6,034,865 | 3/2000 | Roster et al. | 361/601 |

*Primary Examiner*—Gregory Thompson
(74) *Attorney, Agent, or Firm*—Cantor Colburn LLP; Carl B. Horton

(57) ABSTRACT

A drawout unit is dimensioned to make more efficient use of the space within the drawout unit. Devices within the drawout unit are positioned in a generally vertical configuration. A bus brace serves as a line/load terminal assembly. The bus brace has receptacle ports enabling lugs to maintain electrical contact with vertically oriented bus bars on the line terminals and transfer current to horizontally oriented load terminals. Output cables extend horizontally from the load terminals and form a single right angle bend before passing out of the bottom of the drawout unit through an exit port.

17 Claims, 5 Drawing Sheets

DRAWOUT UNIT AND LOAD/LINE TERMINAL ASSEMBLY

CROSS REFERENCE TO RELATED APPLICATION

This application is a continuation of application Ser. No. 09/438,108 Filed Nov. 10, 1999 now abandoned, which is incorporated herein by reference in its entirety.

BACKGROUND OF THE INVENTION

The present invention relates generally to a drawout unit, and, more particularly, to a load/line terminal unit configured to make more efficient use of the space within the drawout unit.

In a motor control system, vertical bus bars which carry current to motor controller units are arranged vertically in drawout units. Sliding stabs usually plug into a housing with opposing prongs being biased toward each other on the sliding stabs to contact either side of the bus bars, whereby the electrical connection between the motor controller unit and the bus bars is maintained. Lugs on the sliding stabs are connected to bus straps extending from the lugs to the line side of a circuit interrupting device such as a circuit breaker. Bus straps also extend from the load side of the circuit interrupting device to the line side of a distribution power load circuit, such as a starter.

Load terminals are electrically connected to the load side of the distribution power load circuit and are typically positioned to allow an output cable to be connected to them in a vertical configuration. These load terminals are generally bushings positioned on the bottom of the distribution power load circuit and have an axially threaded terminal to which output cable connections are made. Alternately, output cables of a thinner diameter may have attachments on one end that allow them to be secured to load terminals with screws or bolts. One particular method of securing output cable to a load terminal, as described in U.S. Pat. No. 4,154,993 entitled "Cable Connected Drawout Switchgear", involves mounting circuit equipment on a rolling carriage such that the load terminals engage connectors on stationary cables when the carriage is rolled over the cable connectors. Another method described in U.S. Pat. No. 5,107,396 entitled "Circuit Breaker Combined Terminal Lug and Connector" involves sliding a cable connector disposed axially on the end of a cable into a receiving slot on a terminal lug. Both of these methods of attaching output cable are such that the output cable depends vertically, and not horizontally, from the load terminals.

Output cable extending vertically down from the load terminals must be bent at two right angles thus forming an S-shape before passing through an exit port in the bottom of the drawout unit. Depending on the voltage class, output cable may be up to a few inches in diameter and relatively inflexible due to its construction. Consequently, the minimum bending radius of the cable may be large. Because of this large minimum bending radius of the cable, and because the output port through which the output cable passes is usually not directly below the load terminals, the cable must be bent at right angles twice to pass out of the drawout assembly. Bending the cable to form two right angles requires an appreciable amount of space more than a single right angle bend would require. Thus, the drawout assembly must be of a larger size than is really necessary to accommodate both right angle bends. Furthermore, as the number of output cables depending from the load terminals increases, an increasing amount of space is required at the bottom of the drawout to accommodate the cables.

SUMMARY OF THE INVENTION

In an exemplary embodiment of the invention, a drawout assembly is configured to confine an electrical motor control unit comprising a plurality of vertically arranged electrical devices. A load terminal is positioned on a bus brace having horizontally-oriented receptacles for receiving lugs which receive output cables. The horizontally-oriented receptacles allow the output cable to be bent only once at a right angle before passing vertically out of the bottom of the drawout assembly. The bus brace has disposed on it a plurality of these receptacles for receiving the lugs, which may or may not be aligned. The lugs are electrically secured within the receptacles to maintain electrical contact with line-connected bus straps positioned under the receptacles.

Attaching output cables to the load terminals in a horizontal configuration will enable the cables to be bent only once before they pass through the exit port. Use of only a single bend will thus allow the same stabs, bus straps, circuit interrupting device, distribution power load circuit, load terminals, and cable to be fit into a smaller drawout due to more efficient use of space. Use of a smaller drawout, while maintaining the same internal components, translates into a more manageable drawout

DETAILED DESCRIPTION

Figure 1:
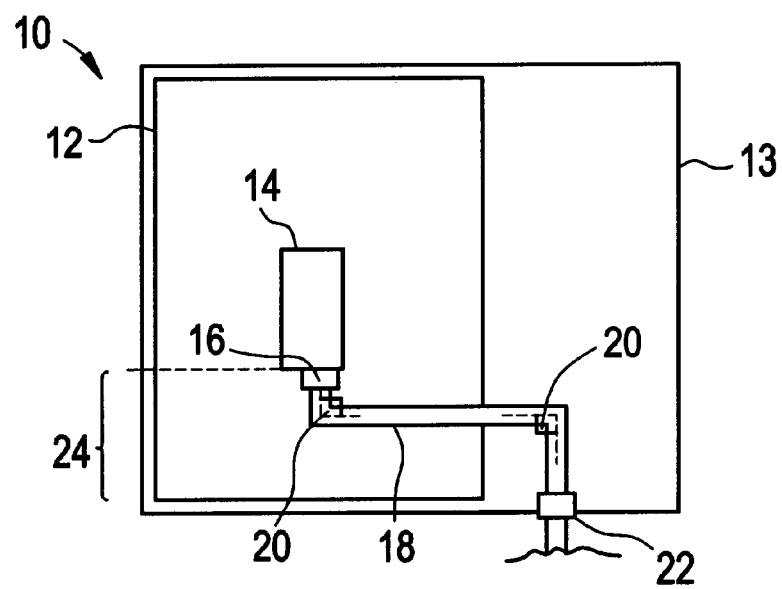
FIG. 1 is a schematic view of a drawout of prior art construction illustrating a distance between the load terminal and the output cable port.

Referring to FIG. 1, a drawout box of the prior art is generally shown at 10. Drawout box 10 is comprised of rigid panels to form a shell 12 that is open on one side. Shell 12 is movably connected to the inside of a second shell or bucket 13. Situated within shell 12 is a distribution power load circuit 14 having a load terminal assembly 16 located generally on the bottom of distribution power load circuit 14. A cable 18 extends vertically down from load terminal assembly 16 and twice is bent at right angles 20 before passing vertically down through an outlet port 22 in the bottom of bucket 13. The radius of cable 18 in combination with right angles 20 defines a distance 24 between load terminal assembly 16 and the bottom wall of shell 12.

Figure 2:
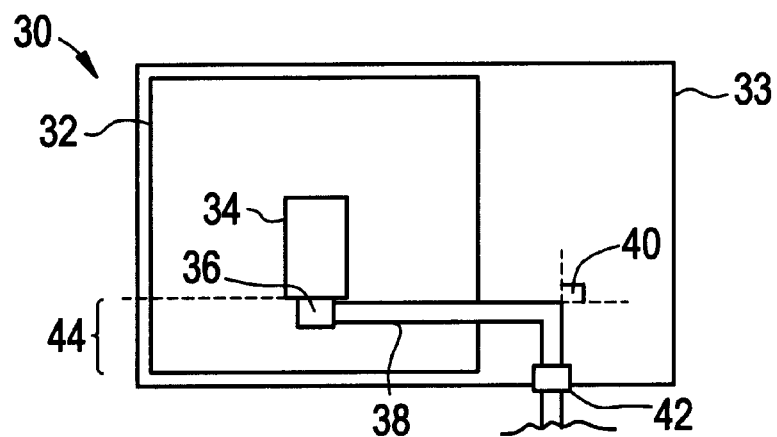
FIG. 2 is a schematic view of a drawout illustrating a decreased distance between the load terminal and the output cable port, of the present invention.

FIG. 2 is a drawout box of an exemplary embodiment of the present invention generally shown at 30. Drawout box 30 is comprised of rigid panels to form a shell 32 that is open on one side. Shell 32 is movably connected to the inside of a second shell or bucket 33. A load terminal assembly 36 is located on the bottom of distribution power load circuit 34. A cable 38 extends horizontally from load terminal assembly 36 and is bent only once at a right angle 40 before passing vertically down through an outlet port 42 in the bottom of bucket 33. The radius of cable 38 in combination with single right angle 40 defines a distance 44 between load terminal assembly 36 and the bottom wall of shell 32. Because of single right angle bend 40 in cable 38, as opposed to double right angle bends 20 in cable 18, distance 44 is less than distance 24. Decreased distance 44 allows drawout box 30 to be made of smaller dimensions thus making a more efficient use of space within drawout box 30 and rendering drawout box 30 more manageable.

Figure 3:
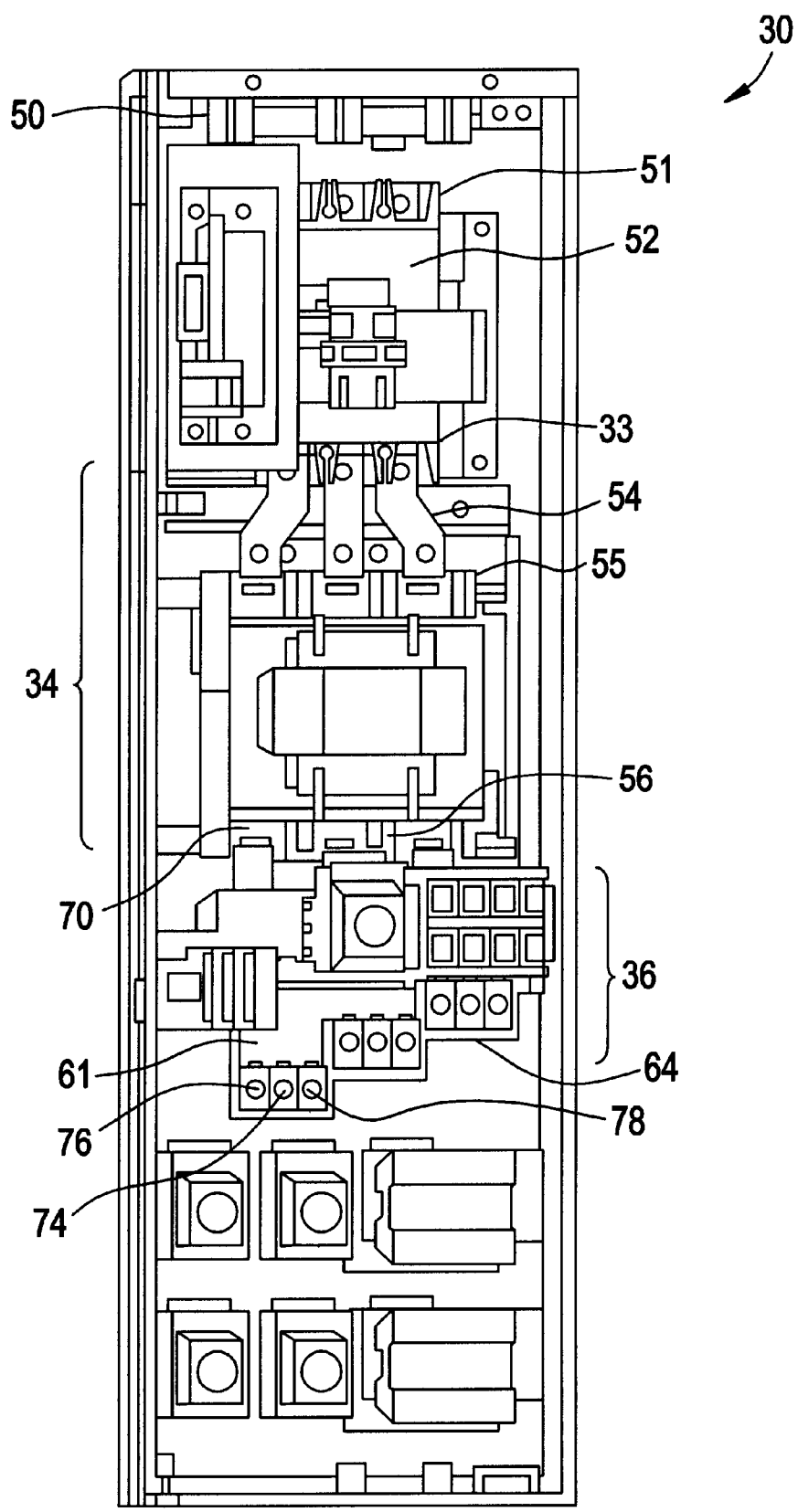
FIG. 3 is a schematic view of a drawout having a vertical stab housing, a circuit interrupting device, a distribution power load circuit, and a load terminal, of the present invention.
Figure 4:
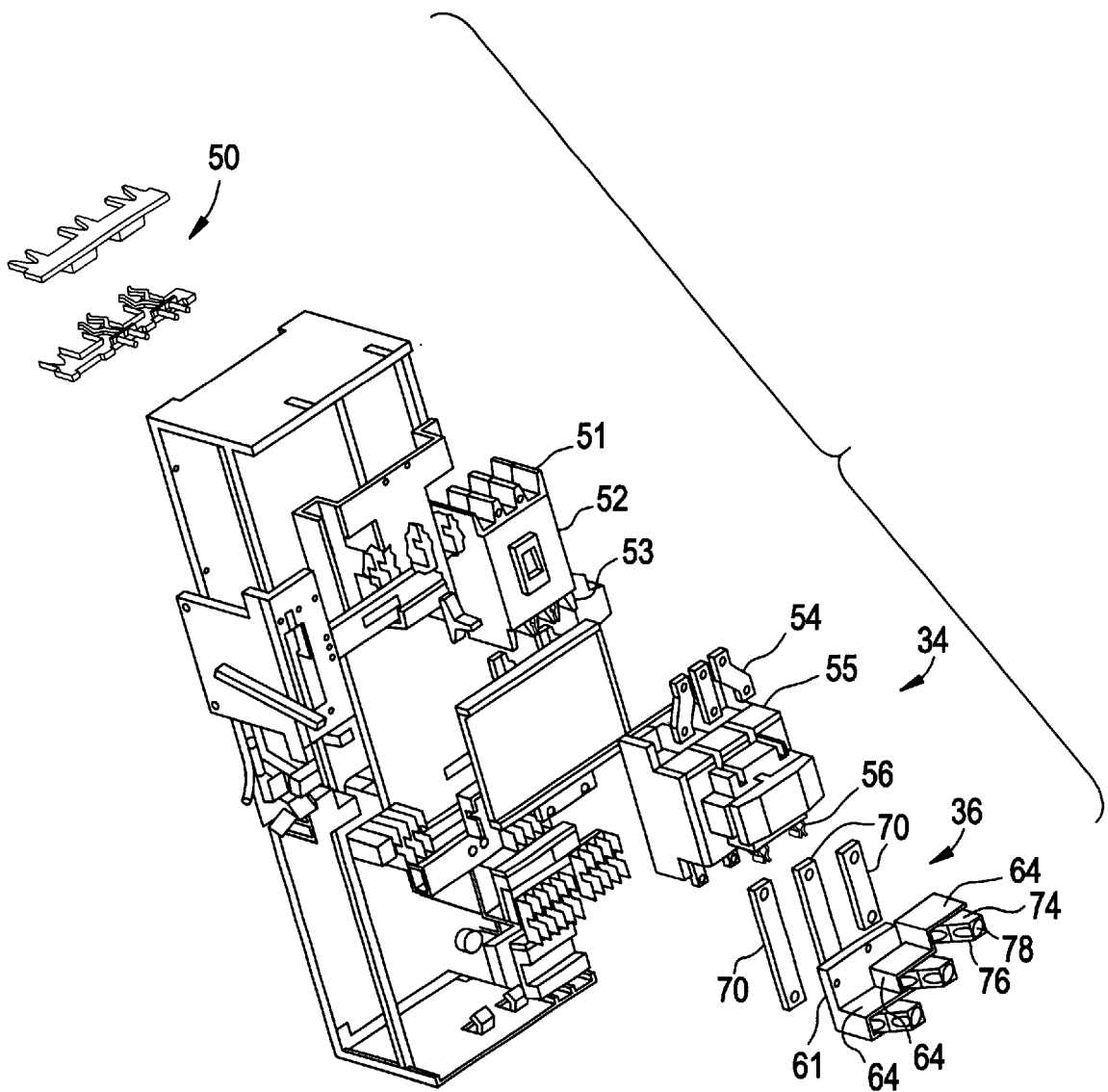
FIG. 4 is an elevated and exploded view of the drawout shown in FIG. 3.

Referring to FIGS. 3 and 4, drawout box 30 is shown in greater detail. A drawout stab unit 50 receives power from bus bars (not shown). The construction of drawout stab unit 50 is well known in the art. Bus straps (not shown) connect drawout stab unit 50 to a line side 51 of a circuit interrupting device 52. A load side 53 of circuit interrupting device 52 is connected by second set of bus straps 54 to a line side 55 of distribution power load circuit 34. A third set of bus straps 70 connects a load side 56 of distribution power load circuit 34 to load terminal assembly 36.

Figure 5:
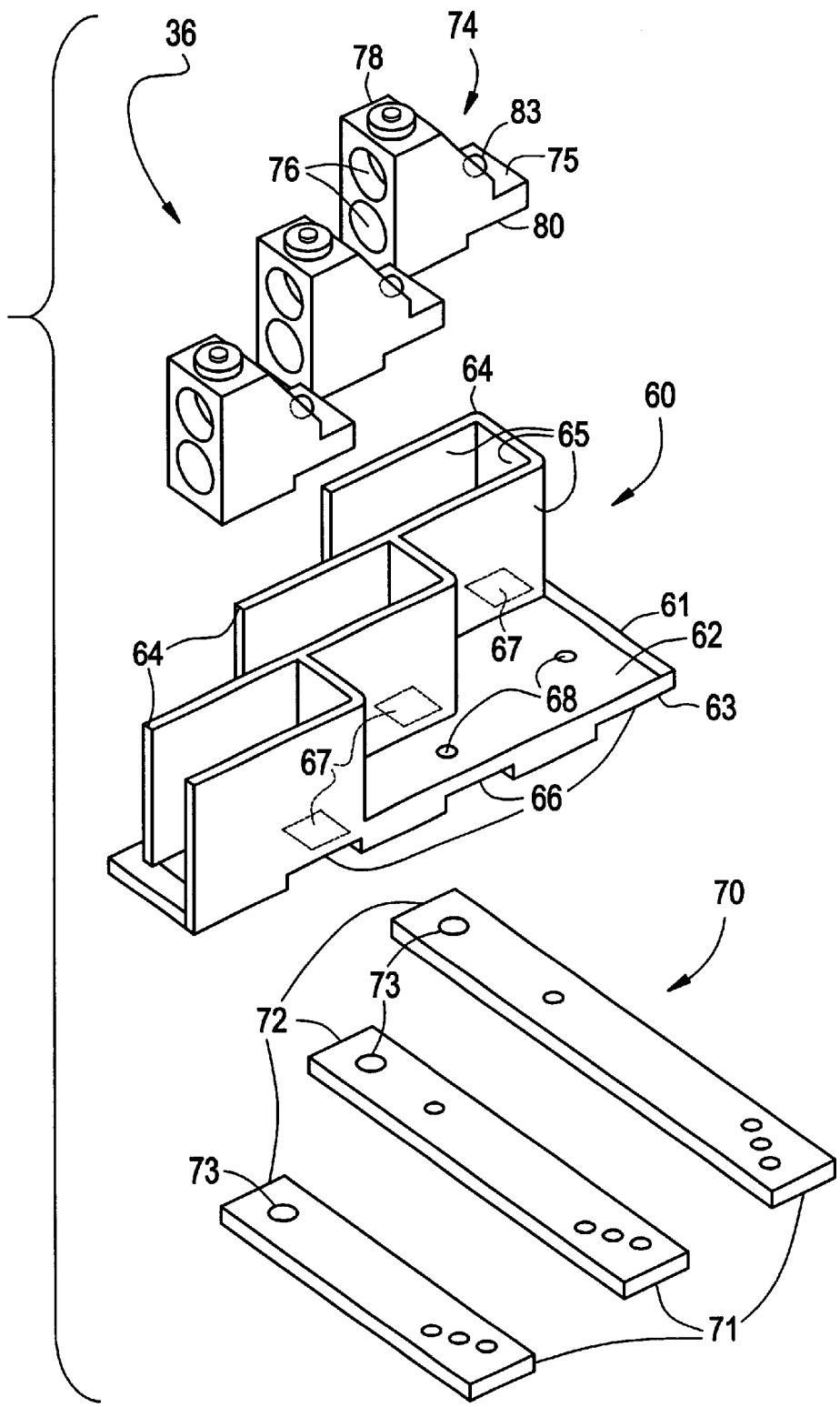
FIG. 5 is an elevated and exploded view of the load terminal assembly, of the present invention.

Load terminal assembly 36 is illustrated in FIG. 5. Load terminal assembly 36 is comprised of a bus brace 60, bus attachments 70, and lugs 74. Bus brace 60 is comprised of a base plate 61 and a plurality of lug-engaging receptacles 64. Base plate 61 has an upper surface 62 and a lower surface 63. Receptacles 64 are positioned on upper surface 62 of base plate 61. Each receptacle 64 has three walls 65 positioned to be substantially perpendicular to base plate 61. The bottoms of walls 65 are fixedly attached to upper surface 62 of base plate 61.The base plate 61 includes holes 68 for securing the base plate 61 inside the drawout switchgear assembly. Openings 67 shown in phantom extend completely through base plate 61 in order to allow lugs 74 received in receptacles 64 to contact bus straps 70. Receptacles 64 are configured and positioned such that the open sides of receptacles 64 all face in the same direction and accept lugs 74 from that direction. Receptacles 64 may be configured to form a rectangle, or, as shown, receptacles 64 may be configured to form a staggered line.

Lower surface 63 of base plate 61 has channels 66 disposed in it. Channels 66 are configured, positioned, and dimensioned to receive bus straps 70. Bus straps 70 have first ends 71 and second ends 72. First ends 71 are secured to load side 56 of distribution power load circuit 34, while second ends 72 are secured to lower surface 63 of base plate 61. In a preferred embodiment, distribution power load circuit 34 would be a starter. Openings 67 in the bottoms of receptacles 64 allow bus straps 70 to be in physical contact with lugs 74 when lugs 74 are received in receptacles 64.

Lugs 74 are dimensioned to be snugly received in receptacles 64 thus preventing lugs 74 from turning within receptacles 64. Lug 74 has ports 76 for receiving output cables 38. A screw 78 extends into port 76 from an adjacent and perpendicularly disposed surface of lug 74. This adjacent and perpendicularly disposed surface is positioned on lug 74 to be exposed when lug 74 is received in receptacle 64. Lug 74 furthermore has a first notched out portion 75 on one side and a second notched out portion 80 on its opposing side. A hole 83 extends from first notched out portion 75 completely through lug 74 to second notched out portion 80. A fastener (not shown) extends from first notched out portion 75 completely through hole 83 and is received by hole 73 in bus strap 70. Securement of fastener locks bus strap 70 into place on load terminal assembly 36.

Cable 38 extends out of lug 74 and out of open side of receptacle 64 and away from load terminal assembly 36 so as to be perpendicularly disposed to a longitudinal axis of bus strap 70. Referring again to FIG. 2, it is clearly shown that cable 38 needs only a single right angle bend to be positioned to pass through an exit port 42 in the bottom of bucket 33.

Figure 6:
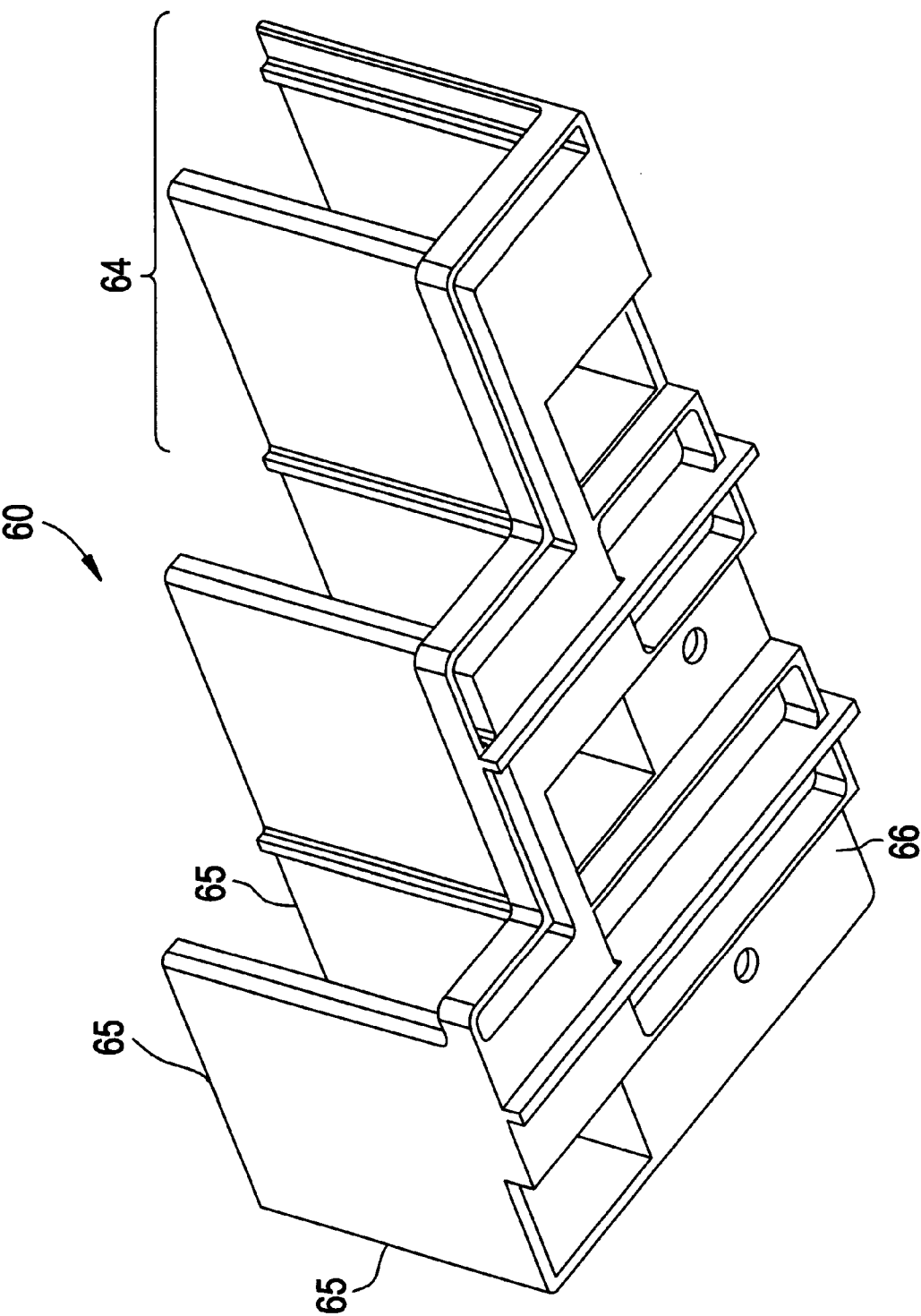
FIG. 6 is an elevated view of the bus brace of the load terminal assembly, of the present invention.

An alternate embodiment of bus brace 60 is shown in greater detail in FIG. 6. In this embodiment, bus brace 60 does not have base plate 61. In either embodiment, bus brace 60 is dimensioned to accommodate a three-phase system wherein the distribution power load circuit 34 is a 3X starter. Bus brace 60 is fabricated of a material sufficient to provide insulating properties as well as rigid support for bus straps 70 during torquing of lug 74. The distance between receptacles 64 is defined by the thickness of walls 65 of receptacles 64. This thickness is calculated to minimize the distance between the phases. The open sides of receptacles 64 allow receptacles 64 to accommodate cabling for motor leads, while channels 66, in conjunction with raised portions on lower surface 63, provide a clamping force between bus brace 60 and bus strap 70 while retaining the antiturn characteristics of lugs 74.

While this invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A drawout switchgear assembly comprising:
    a shell housing having top, sides, bottom, and back panels, said shell housing being movably positioned within a bucket;
    a motor controller unit situated within said shell housing, said motor controller unit having devices comprising:
        a stab assembly connected to an outside current producing source;
        a circuit interrupting device electrically connected to said stab assembly through a first set of bus straps;
        a distribution power load circuit electrically connected to said circuit interrupting device through a second set of bus straps;
        a load/line terminal assembly electrically connected to said distribution power load circuit through a third set of bus straps, each bus strap in said third set of bus straps having a longitudinal axis, said load/line terminal assembly having a plurality of lug engaging receptacles mounted upon a base plate in which a corresponding number of lugs are received, each lug having a port with an axis lying parallel to a plane of the base plate and in a direction substantially perpendicular to the longitudinal axis of a bus strap in said third set of bus straps; and
        a plurality of output cables each having first and second ends, said first end of each output cable being received by the port in one of said lugs, and said output cables being kept substantially straight while passing out of a side of said shell and into said bucket, and being bent at a single right angle at a point outside of said shell but within said bucket; and
    an exit port disposed in a bottom of said bucket through which said second ends of said output cables pass.

2. The drawout switchgear assembly of claim 1 wherein said devices of said motor controller unit are positioned within said shell housing in a generally vertical configuration.

3. The drawout switchgear assembly of claim 2 wherein said lugs are positioned to receive said output cables from a horizontal direction.

4. The drawout switchgear assembly of claim 3 wherein said drawout switchgear assembly is of a size 6.

5. A bus brace for use in a load/line terminal assembly comprising:

- a base plate having upper and lower surfaces, said base plate being fabricated of a material having electrically insulating properties and having holes disposed therein for securing said base plate inside a drawout switchgear assembly;
- a plurality of openings in said base plate extending through said base plate from said upper surface to said lower surface through which an electrical contact can be made;
- a plurality of lug-engaging receptacles positioned on said upper surface of said base plate, each of said receptacles comprising three walls perpendicularly mounted to said base plate, each of said receptacles being positioned over at least one of said openings in said base plate, and each of said receptacles being open on a top portion of each of said receptacles; and
- a plurality of channels positioned in said lower surface of said base plate, each of said channels being configured, positioned, and dimensioned to correspond with at least one of said openings in said base plate through which an electrical contact can be made.

6. The bus brace of claim 5 wherein said receptacles are positioned on said upper surface of said base plate so as to be staggered across said base plate at about a forty-five degree angle.

7. The bus brace of claim 6 wherein said channels each have a longitudinal axis, said longitudinal axis being positioned to be generally parallel to said open sides of said receptacles.

8. A load/line terminal assembly comprising a bus brace, the bus brace having a base plate, an upper surface of said base plate supporting a plurality of lug engaging receptacles, a lower surface of said base plate including sections for receiving bus straps, a corresponding number of lugs for receipt within the plurality of lug engaging receptacles, each lug including at least one port for receiving an output cable, each port having an axis ling parallel to a plane of said base plate and substantially perpendicular to longitudinal axes of the sections in the lower surface of said base plate.

9. The load/line terminal assembly of claim 8 wherein each lug includes two ports for receiving output cables.

10. The load/line terminal assembly of claim 8 wherein each lug engaging receptacle has three walls, the at least one port for receiving an output cable accessible through an open side of lug engaging receptacle.

11. The load/line terminal assembly of claim 8 wherein each lug includes a first notched portion, a second notched portion, and a hole passing through the first and second notched portions.

12. The load/line terminal assembly of claim 8 wherein each lug includes a screw passing perpendicularly through said at least one port.

13. The load/line terminal assembly of claim 2 wherein said screw is accessible through a side of the lug engaging receptable which is parallel to the base plate.

14. The load/line terminal assembly of claim 8 wherein the sections for receiving bus straps are channels.

15. The load/line terminal assembly of claim 8 wherein an opening is positioned on the base plate below each lug engaging receptacle.

16. The load/line terminal assembly of claim 8 wherein the lug engaging receptacles are staggered across the base plate.

17. The load/line terminal assembly of claim 10 wherein the open side of each lug engaging receptable for accessing said at least one port is perpendicular to the base plate.

\* \* \* \* \*